(12) United States Patent
Bodnar et al.

(10) Patent No.: US 11,571,809 B1
(45) Date of Patent: Feb. 7, 2023

(54) ROBOTIC CONTROL USING VALUE DISTRIBUTIONS

(71) Applicant: X Development LLC, Mountain View, CA (US)

(72) Inventors: Cristian Bodnar, Palo Alto, CA (US); Adrian Li, San Francisco, CA (US); Karol Hausman, Mountain View, CA (US); Peter Pastor Sampedro, Oakland, CA (US); Mrinal Kalakrishnan, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 242 days.

(21) Appl. No.: 17/017,920

(22) Filed: Sep. 11, 2020

Related U.S. Application Data

(60) Provisional application No. 62/900,604, filed on Sep. 15, 2019.

(51) Int. Cl.
*B25J 9/16* (2006.01)
*B25J 13/08* (2006.01)

(52) U.S. Cl.
CPC ............. *B25J 9/161* (2013.01); *B25J 9/1612* (2013.01); *B25J 9/1697* (2013.01); *B25J 13/08* (2013.01)

(58) Field of Classification Search
CPC ........ B25J 9/161; B25J 9/1612; B25J 9/1697; B25J 13/08
USPC .................. 700/245–264; 318/568.11–568.25
See application file for complete search history.

(56) References Cited

U.S. PATENT DOCUMENTS

| | | | | |
|---|---|---|---|---|
| 5,214,746 A | * | 5/1993 | Fogel | G06N 3/086 706/15 |
| 5,649,064 A | * | 7/1997 | Jorgensen | G06F 30/20 73/147 |
| 5,796,922 A | * | 8/1998 | Smith | G06N 3/063 706/903 |
| 6,330,553 B1 | * | 12/2001 | Uchikawa | G05B 13/0285 706/903 |

(Continued)

OTHER PUBLICATIONS

Shaun Wang, "Premium Calculation by Transforming the Layer Premium" Astin Bulletin, vol. 26, No. 1. 1996, pp. 71-92.

(Continued)

*Primary Examiner* — Jaime Figueroa
(74) *Attorney, Agent, or Firm* — Gray Ice Higdon

(57) ABSTRACT

Techniques are described herein for robotic control using value distributions. In various implementations, as part of performing a robotic task, state data associated with the robot in an environment may be generated based at least in part on vision data captured by a vision component of the robot. A plurality of candidate actions may be sampled, e.g., from continuous action space. A trained critic neural network model that represents a learned value function may be used to process a plurality of state-action pairs to generate a corresponding plurality of value distributions. Each state-action pair may include the state data and one of the plurality of sampled candidate actions. The state-action pair corresponding to the value distribution that satisfies one or more criteria may be selected from the plurality of state-action pairs. The robot may then be controlled to implement the sampled candidate action of the selected state-action pair.

20 Claims, 8 Drawing Sheets

(56) References Cited

U.S. PATENT DOCUMENTS

| | | | | |
|---|---|---|---|---|
| 7,260,551 | B2* | 8/2007 | Phillips | G06Q 10/06375 |
| | | | | 705/7.28 |
| 7,751,937 | B2* | 7/2010 | Sabe | G06N 20/00 |
| | | | | 700/245 |
| 9,440,352 | B2* | 9/2016 | Meier | B25J 19/023 |
| 10,207,402 | B2* | 2/2019 | Levine | G06N 3/084 |
| 10,318,881 | B2* | 6/2019 | Rose | G06N 10/00 |
| 10,706,352 | B2* | 7/2020 | Wang | G06N 3/006 |
| 10,800,040 | B1* | 10/2020 | Beckman | B25J 9/1671 |
| 10,891,534 | B2* | 1/2021 | Dasgupta | G06N 3/088 |
| 10,960,539 | B1* | 3/2021 | Kalakrishnan | G05B 13/027 |
| 11,074,495 | B2* | 7/2021 | Zadeh | G06V 10/25 |
| 11,213,947 | B2* | 1/2022 | Leon | B25J 9/1661 |
| 2003/0004777 | A1* | 1/2003 | Phillips | G06Q 10/0639 |
| | | | | 705/7.28 |
| 2006/0195227 | A1* | 8/2006 | Sabe | G05B 13/021 |
| | | | | 700/245 |
| 2015/0100530 | A1* | 4/2015 | Mnih | A63F 13/67 |
| | | | | 706/25 |
| 2016/0321559 | A1* | 11/2016 | Rose | G06N 10/00 |
| 2017/0252922 | A1* | 9/2017 | Levine | B25J 9/1664 |
| 2017/0270408 | A1* | 9/2017 | Shi | G06N 3/08 |
| 2017/0337682 | A1* | 11/2017 | Liao | A61B 5/7267 |
| 2018/0197083 | A1* | 7/2018 | Dasgupta | G06N 3/0445 |
| 2018/0204111 | A1* | 7/2018 | Zadeh | G06N 3/0436 |
| 2019/0184561 | A1* | 6/2019 | Yip | G06N 5/046 |
| 2019/0251419 | A1* | 8/2019 | Pascanu | G06N 3/08 |
| 2019/0258918 | A1* | 8/2019 | Wang | G06N 3/088 |
| 2019/0321974 | A1* | 10/2019 | Leon | B25J 9/1661 |
| 2019/0385022 | A1* | 12/2019 | Jang | G06K 9/6256 |
| 2020/0061811 | A1* | 2/2020 | Iqbal | B25J 9/1612 |
| 2020/0175364 | A1* | 6/2020 | Xu | G06N 3/04 |
| 2020/0258227 | A1* | 8/2020 | Liao | G06T 7/30 |
| 2020/0293862 | A1* | 9/2020 | Wang | G06N 3/0472 |
| 2021/0086353 | A1* | 3/2021 | Shah | G05B 13/027 |
| 2021/0237266 | A1* | 8/2021 | Kalashnikov | B25J 9/1697 |
| 2021/0271968 | A1* | 9/2021 | Ganin | G06N 3/0445 |
| 2022/0193895 | A1* | 6/2022 | Leon | B25J 9/1612 |
| 2022/0193914 | A1* | 6/2022 | Liu | B25J 9/1605 |

OTHER PUBLICATIONS

Hado van Hasselt, "Double Q-learning" Multi-agent and Adaptive Computation Group Centrum Wiskunde & Informatica. 9 pages.
Sutton & Barto et al., "Reinforcement Learning: An Introduction" The MIT Press. 2014. 352 pages.
Botev et al., "The Cross-Entropy Method for Optimization" Department of Computer Science and Operations Research. 29 pages.
Rockafellar et al., "Optimization of Conditional Value-at-Risk" University of Washington, Dept. of Applied Mathematics. 26 pages. Dated Sep. 5, 1999.
Martin L. Puterman, "Markov Decision Processes: Discrete Stochastic Dynamic Programming" Wiley-Interscience, A John Wiley & Sons, Inc., Publication. 30 pages. 1994.
Pinto & Gupta et al., "Supersizing Self-supervision: Learning to Grasp from 50K Tries and 700 Robot Hours" arXiv:1509.06825v1 [cs.LG] dated Sep. 23, 2015.
Peter J. Huber, "Robust Estimation of a Location Parameter" The Annals of Mathematical Statistics. 29 pages.
Henderson et al., "Deep Reinforcement Learning that Matters" arXiv:1709.06560v3 [cs.LG], Dated Jan. 30, 2019.
Gonzalez & Wu, "On the Shape of the Probability Weighting Function" Academic Press. Cognitive Psychology 38, 129-166. (1999). Article ID cogp. 1998.0710, available online at http://www.idealibrary.com.
Wu & Gonzalez, "Curvature of the Probability Weighting Function" Management Science. vol. 42, No. 12. Dated Dec. 1996.
Shaun S. Wang, "A Class of Distortion Operators for Pricing Financial and Insurance Risks" The Journal of Risk and Insurance, vol. 67, No. 1. Dated Mar. 2000. pp. 15-36.
Quillen et al., "Deep Reinforcement Learning for Vision-Based Robotic Grasping: A Simulated Comparative Evaluation of Off-Policy Methods" arXiv:1802.10265v2 [cs.RO] Dated Mar. 28, 2018.
Majumdar & Pavone, "How Should a Robot Assess Risk? Towards an Axiomatic Theory of Risk in Robotics" Department of Aeronautics and Astronautics. Stanford University.
Mahler et al., "Dex-Net 1.0: A Cloud-Based Network of 3D Objects for Robust Grasp Planning Using a Multi-Armed Bandit Model with Correlated Rewards" IEEE International Conference on Robotics and Automation.
Lillicrap et al., "Continuous Control with Deep Reinforcement Learning" arXiv:1509.02971v6 [cs.LG]. Dated Jul. 5, 2019.
Mahler et al., "Dex-Net 2.0: Deep Learning to Plan Robust Grasps with Synthetic Point Clouds and Analytic Grasp Metrics" arXiv:1703.09312v3 [cs.RO]. Dated Aug. 8, 2017.
Levine et al., "Learning Hand-Eye Coordination for Robotic Grasping with Deep Learning and Large-Scale Data Collection" arXiv:1603.02199v4 [cs.LG]. Dated Aug. 28, 2016.
Levine et al., "End-to-End Training of Deep Visuomotor Policies" Journal of Machine Learning Research 17 (2016) pp. 1-40.
Dabney et al., Implicit Quantile Networks for Distributional Reinforcement Learning arXiv:1806.06923v1 [cs.LG]. Dated Jun. 14, 2018.
Dabney et al., "Distibutional Reinforcement Learning with Quantile Regression" The Thirty-Second AAAI Conference on Artificial Intelligence (AAAI-18) 10 pages. 2018.
Kalashnikov et al., "Scalable Deep Reinforcement Learning for Vision-Based Robotic Manipulation" 2nd Conference on Robot Learning (CoRL 2018), Zurich, Switzerland. 23 pages.
Kumar et al., "Stablizing Off-Policy Q-Learning via Bootstrapping Error Reduction" arXiv:1906.009491 [cs.LG]. Dated Jun. 3, 2019. 18 pages.
Agarwal et al., "Striving for Simplicity in Off-policy Deep Reinforcement Learning" arXiv:1907.04543v1 [cs.LG]. Dated Jul. 10, 2019. 17 pages.
Barth-Maron et al., "Distributed Distribuational Deterministic Policy Gradients" arXiv:1804.08617v1 [cs.LG]. Dated Apr. 23, 2018.
Bellemare et al., "A Distributional Perspective on Reinforcement Learning" arXiv:1707.06887v1 [cs.LG]. Dated Jul. 21, 2017.

* cited by examiner

ROBOTIC CONTROL USING VALUE DISTRIBUTIONS

BACKGROUND

Reinforcement learning may be used to train an actor network and/or a critic network that, when trained, can be utilized by a robot in performing a robotic task in which the robot interacts with one or more environmental objects. Robotic tasks can include robotic grasping, or other non-grasping robotic tasks such as opening a door, throwing a ball, pushing objects, traversing through an area, etc. An actor network may be, for instance, a trained neural network that can be used to generate probabilities for a plurality of candidate actions based on a current state. The robot may select one of the candidate actions based on the probabilities. A critic network may be, for instance, a neural network model that approximates a state-action value function.

In some reinforcement learning approaches, the critic network may be used to train the actor network only; during inference, the actor network may be used exclusively to control the robot. In other reinforcement learning approaches, the critic network may be used alone in performing the robotic task. For example, the trained critic network can be used to process state-action pairs that each include current state data (e.g., vision data and/or other data) along with a corresponding one of N sampled candidate actions. These N sampled candidate actions may be sampled using techniques such as the cross-entropy method (CEM) and/or other technique(s).

A corresponding value is generated for each of the sampled candidate actions based on the processing of the sampled candidate action and the robot state data. These values may correspond, for instance, to likelihoods of ultimately completing the robotic task successfully if that action is taken during this iteration. The candidate action corresponding to the "best" generated value can be selected during that iteration for implementation by the robot. Upon completion of implementing the candidate action, the process can then be repeated to select a next candidate action to be implemented by the robot during a next iteration. This can continue until, for example, a candidate action is selected that corresponds to a termination action, thereby enabling a sequence of actions to be sequentially selected and sequentially implemented in performing the robotic task.

One non-limiting example of a reinforcement learning approach proposed for robotic control is QT-Opt. QT-Opt is a distributed Q-Learning algorithm suitable for continuous action spaces. The QT-Opt approach trains a parameterized state-action value function $Q_\theta(s, a)$ which is represented by a neural network model with parameters $\theta$. CEM is used to iteratively optimize and select the best action for a given Q function:

$$\pi_\theta(S) = \arg\max_a Q_\theta(s, a) \qquad (1)$$

In order to train the Q function, a separate process called the "Bellman updater" samples transition tuples (s, a, r, s') containing the state s, action a, reward r and next state s' from a replay buffer and generates Bellman target values according to a Q-learning algorithm, such as:

$$\hat{Q}(s,a,s') = r(s,a) + \gamma V(s') \qquad (2)$$

where $V(s') = Q_{\bar{\theta}_1}(s', \pi_{\bar{\theta}_2}(s'))$ and $\bar{\theta}_1$ and $\bar{\theta}_2$ are the parameters of two delayed target networks. These target values are pushed to another replay buffer D, and a separate training process optimizes the Q-value function against a training objective:

$$\varepsilon(\theta) = \mathbb{E}_{\hat{Q}(s,a,s') \sim D}[D(Q_\theta(S,a), \hat{Q}(s,a,s'))] \qquad (3)$$

SUMMARY

Implementations are described herein for controlling robots using value distributions generated by critic networks. As referenced in the background above, various techniques have been proposed that, at the completion of each prior robotic action, select a new robotic action by sampling a plurality of candidate actions using CEM and/or other technique(s). In determining the robotic action to implement at a next iteration, each of the sampled robotic actions is processed, utilizing a trained critic network and along with vision data and/or other sensor data, to generate a corresponding discrete (e.g., scalar) value. The sampled robotic action with the "best" corresponding value (e.g., highest or lowest depending on the implementation) can then be selected and implemented.

Implementations disclosed herein generate, for a plurality of sampled state-action pairs, a plurality of corresponding value distributions. In contrast to a discrete value, a value distribution comprises a range of potential values of a given candidate action. This range may comprise a set (e.g., a vector) of multiple potential values or a continuous range of values, and may include a lower bound or minimum, and an upper bound or maximum. By utilizing value distributions it is possible to not only control a robot to perform a robotic task, but to control how conservatively the robot behaves while performing the robotic task.

For example, and as will be described herein, various "out-of-band" signals aside from the input to the critic network may be considered, e.g., in conjunction with the processing performed by the critic network, to determine how conservatively the robot should behave. These out-of-band signals may include, for instance, user preferences, attributes of the robotic task such as its difficulty or time allotted to the robot to perform the task (e.g., before the next widget arrives at the robot's workspace), the robot's skill or experience in performing the task or similar tasks, attributes of the environment in which the task is performed, attributes of an object-to-be-acted-upon, etc. In some implementations, one or more of these out-of-band signals may be used to determine a desired measure of risk-seeking (e.g., a measure of how conservatively the robot should behave).

In various implementations disclosed herein, off-policy deep reinforcement learning is used to train the critic network, and the off-policy deep reinforcement learning is based on self-supervised data collection (e.g., using only self-supervised data). On-policy deep reinforcement learning can also be used to train the critic network, and can optionally be interspersed with the off-policy deep reinforcement learning as described herein. The self-supervised data utilized in the off-policy deep reinforcement learning can be based on sensor observations from real-world robots in performance of episodes of the robotic task, and can optionally be supplemented with self-supervised data from robotic simulations of performance of episodes of the robotic task. Through off-policy training, large-scale autonomous data collection, and/or other techniques disclosed herein, implementations can learn policies that generalize effectively to previously unseen objects, previously unseen environments, etc. The critic network can be a machine learning model, such as a neural network model. Moreover, as described herein, implementations of the reinforcement learning utilized in training the neural network model utilize a continuous-action variant of Q-learning. Accordingly, the critic network can represent the Q-function.

To enable the critic network to learn generalizable strategies, it is trained on a diverse set of data representing various objects and/or environments. For example, a diverse set of objects can be used to enable the critic network to learn generalizable strategies for grasping, such as picking up new objects, performing pre-grasp manipulation, and/or handling dynamic disturbances with vision-based feedback. Implementations disclosed herein utilize a continuous-action generalization of Q-learning. Unlike other continuous action Q-learning methods, which are often unstable, techniques described herein dispense with the need to train an actor network, and instead uses stochastic optimization to select actions (during inference) and target Q-values (during training). Moreover, training can be performed off-policy, which makes it possible to pool experience from multiple robots and multiple experiments. For example, the data used to train the critic network can be collected over multiple robots operating over long durations. Even fully off-policy training can provide improved performance for task performance, while a moderate amount of on-policy fine-tuning can further improve performance.

In various implementations, during inference, stochastic optimization is utilized to stochastically select actions to evaluate in view of a current state and using the critic network—and to stochastically select a given action (from the evaluated actions) to implement in view of the current state. For example, the stochastic optimization can be a derivative-free optimization algorithm, such as the cross-entropy method (CEM). CEM samples a batch of N values at each iteration, fits a Gaussian distribution to the best M<N of these samples, and then samples next batch of N from that Gaussian. As one non-limiting example, N can be 64 and M can be 6. During inference, CEM can be used to select 64 candidate actions, those actions evaluated in view of a current state and using the critic network, and the 6 best can be selected (e.g., the 6 with the highest Q-values generated using the critic network). A Gaussian distribution can be fit to those 6, and 64 more actions selected from that Gaussian. Those 64 actions can be evaluated in view of the current state and using the critic network, and the best one (e.g., the one with the highest Q-value generated using the critic network) can be selected as the action to be implemented. The preceding example is a two iteration approach with N=64 and M=6. Additional iterations can be utilized, and/or alternative N and/or M values.

In various implementations, during training, stochastic optimization is utilized to determine a target Q-value for use in generating a loss for a state-action pair to be evaluated during training. For example, stochastic optimization can be utilized to stochastically select actions to evaluate—and to stochastically select a Q-value that corresponds to a given action (from the evaluated actions). The target Q-value can be determined based on the selected Q-value. For example, the target Q-value can be a function of the selected Q-value and the reward (if any) for the state, action pair being evaluated.

The above description is provided as an overview of only some implementations disclosed herein. These and other implementations are described in more detail herein.

In some implementations, a method may be implemented using one or more processors, and may include: generating state data associated with the robot in an environment, wherein the state data is generated based at least in part on vision data captured by a vision component of the robot; sampling a plurality of candidate actions that are available for performance by the robot given the state data; processing, utilizing a machine learning model that has been trained to learn a value function, a plurality of state-action pairs to generate a corresponding plurality of value distributions, wherein each state-action pair includes the state data and one of the plurality of sampled candidate actions; selecting, from the plurality of state-action pairs, the state-action pair corresponding to the value distribution that satisfies one or more criteria; and controlling the robot to implement the sampled candidate action of the selected state-action pair.

In various implementations, the method may further include calculating, for each value distribution of the plurality of value distributions, a summary value, wherein the selecting includes selecting the state-action pair corresponding to the summary value that satisfies one or more of the criteria. In various implementations, the summary value comprises a mean of the value distribution. In various implementations, the method may further include distorting the value distribution based on a desired measure of risk seeking, wherein the summary value is calculated based on the distorted value distribution.

In various implementations, the desired measure of risk seeking may be determined from one or more signals. In various implementations, one or more of the signals may include a measure of entropy associated with the environment. In various implementations, one or more of the signals may include a measure of uncertainty associated with the environment. In various implementations, one or more of the signals may include one or more attributes of the robotic task. In various implementations, the one or more attributes may include a measure of skill of the robot in performing the robotic task. In various implementations, the one or more attributes may include a measure of difficulty of the robotic task. In various implementations, one or more of the signals may include a user preference. In various implementations, the method may further include performing object recognition processing on the vision data to identify a class of an object present in the environment, and one or more of the signals may include the class of the object.

In various implementations, the plurality of candidate actions may be sampled from a continuous action space.

Various implementations may include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations may include a system of one or more computers and/or one or more robots that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
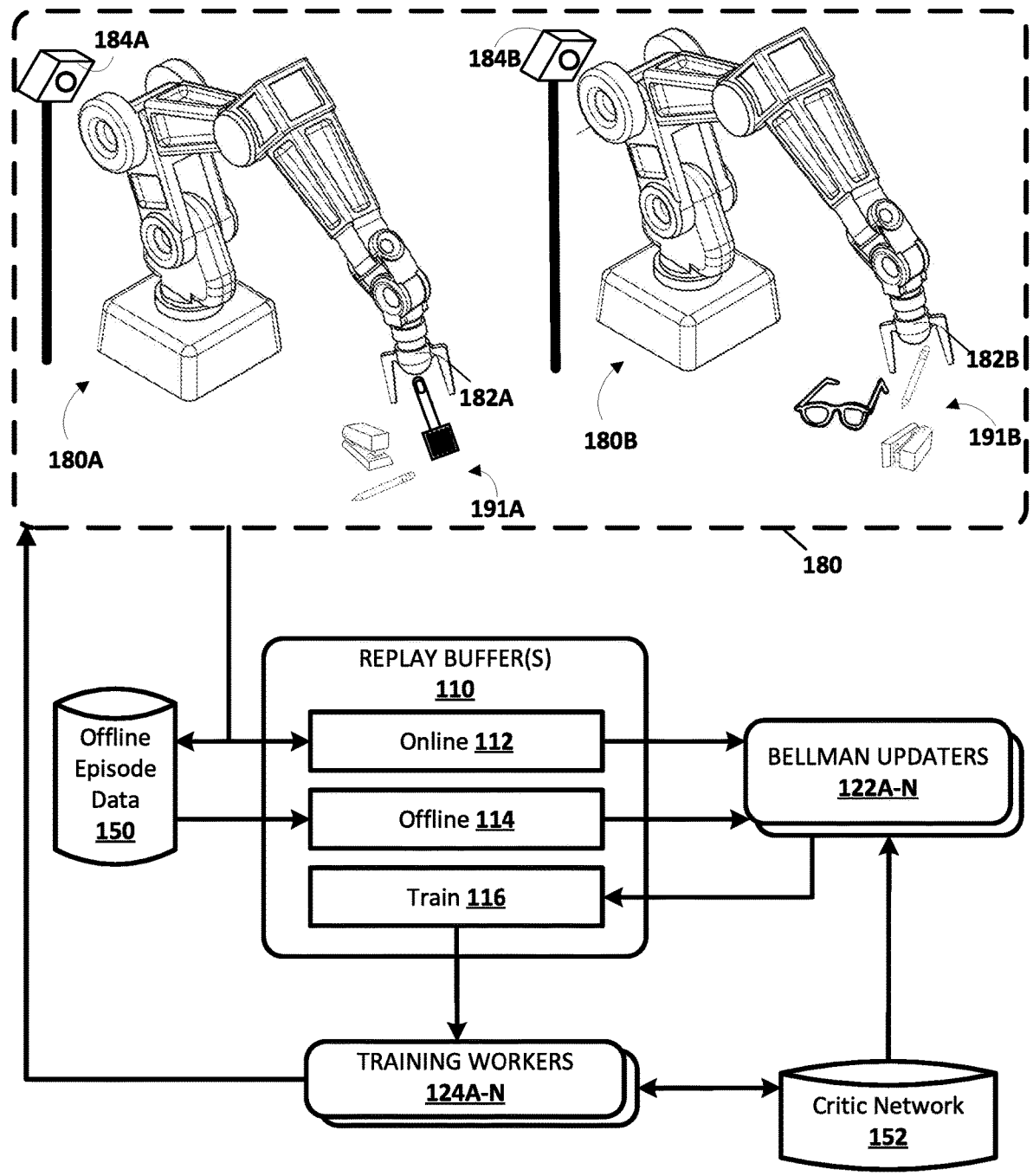
FIG. 1 illustrates an example environment in which implementations disclosed herein can be implemented.

In order to extend the QT-Opt approach to generate value distributions, the value function represented by the trained network will no longer predict scalar/discreet values. Rather, it is trained to predict a vector $q_\theta(s, a, \tau)$ that approximates the quantile function output for a vector of input probabilities $\tau$, with $\tau_i \in [0,1]$ and $i=1, \ldots, N$. Thus, in some implementations, the i-th element of $q_\theta(s, a, \tau)$ approximates $F_{s,a}^{-1}(\tau_i)$, where $F_{s,a}^{-1}$ is the inverse CDF of the random action-value pair associated with the state-action pair, (s, a). This approach will be referred to herein variously as "distributional QT-Opt" and "quantile QT-Opt."

Unlike QT-Opt where the CEM is used to optimize directly over the Q values, for distributional QT-Opt, the CEM may be used to maximize a scoring function $\psi : \mathbb{R}^N \to \mathbb{R}$, that maps the vector q to a score $\psi(q)$:

$$\pi_\theta(s,\tau) = \arg\max_a \psi(q_\theta(s,a,\tau)) \qquad (4)$$

Similarly, the target values produced by the "Bellman updater" may be vectorized:

$$\hat{q}_{\bar{\theta}}(s, a, s', \tau', \tau'') = \qquad (5)$$
$$r(s, a)\mathbf{1} + \gamma v(s', \tau', \tau'') v(s', \tau', \tau'') = q_{\bar{\theta}_1}\left(s', \pi_{\bar{\theta}_2}(s', \tau''), \tau'\right)$$

where 1 is a vector of ones and $\bar{\theta}_1$ and $\bar{\theta}_2$ are the parameters of two delayed target networks. There are multiple distributional QT-Opt approaches contemplated herein. One approach is based on Quantile Regression and is referred to herein as "Q2R-Opt." Another approach is based on implicit quantile networks and is referred to herein as "Q2F-Opt."

Quantile Regression QT-Opt (Q2R-Opt)

In Q2R-Opt, the vectors $\tau$, $\tau'$, and $\tau''$ in q and $\hat{q}$ are fixed. They contain N quantile midpoints of the value distribution. Concretely, $q_i(s, a, \tau)$ is assigned the fixed quantile target $t_i = \bar{\tau}_{i-1} + \bar{\tau}_i/2$ with $\bar{\tau}_i = i/N$. The scoring function $\psi(\cdot)$ may take the mean of this vector to reduce the N quantile midpoints to the expected value of the distribution. Because $\tau$, $\tau'$, and $\tau''$ are fixed they may be considered implicit and may be omitted as arguments in the equations below.

The quantile heads may be optimized, for example, by minimizing the Huber quantile regression loss:

$$\rho_\tau^\kappa(\delta_{ij}) = |\tau - \mathbb{1}\{\delta_{ij} < 0\}| \mathcal{L}_\kappa(\delta_{ij}) \mathcal{L}_\kappa(\delta_{ij}) = \begin{cases} \frac{1}{2}\delta_{ij}^2, & \text{if } |\delta_{ij}| \leq \kappa \\ \kappa(|\delta_{ij}| - \frac{1}{2}\kappa), & \text{otherwise} \end{cases} \qquad (6)$$

for all the pairwise TD-errors:

$$\delta_{ij} = \hat{q}_j(s,a,s') - q_1(s,a) \qquad (7)$$

Thus, the network is trained to minimize the loss function:

$$\varepsilon(\theta) = \mathbb{E}_{(s,a,s') \sim D}[\Sigma_{i=1}^N \mathbb{E}_j[\rho_{\tau_i}^\kappa(\delta_{ij})]] \qquad (8)$$

Quantile Function QT-Opt (Q2F-Opt)

In Q2F-Opt, the neural network itself approximates the quantile function of the value distribution. Accordingly, the neural network may be used to process an additional input of probabilities $\tau$, with $\tau_i \in [0,1]$ and $i=1, \ldots, N$. Thus, $q_i(s, a, \tau)$ approximates $F_{s,a}^{-1}(\tau_i)$, where $F_{s,a}$ is the CDF of the Q distribution belonging to the state action pair (s,a). Because $\tau$, $\tau'$, and $\tau''$ are no longer fixed, they are included in q and $\hat{q}$. For Q2F-Opt, the TD-errors $\delta_{ij}$ take the form to Q2R-Opt:

$$\delta_{ij} = \hat{q}_j(s,a,s',\tau',\tau'') - q_i(s,a,\tau), \qquad (9)$$

where, $\tau_i \sim U[0,1]$, $\tau'_j \sim U[0,1]$ and $\tau''_j \sim U[0,1]$ are sampled from two independent uniform distributions. Note that now the length of the prediction and target vectors are determined by the lengths of $\tau$ and $\tau'$. Consequently, $q_i(s, a, \tau)$ and $q'_i(s, a, \tau')$ have two independent lengths N and N', respectively.

Turning now to the figures, FIG. 1 illustrates robots 180, which include robots 180A, 180B, and optionally other (unillustrated) robots. Robots 180A and 180B are "robot arms" having multiple degrees of freedom to enable traversal of grasping end effectors 182A and 182B along any of a plurality of potential paths to position the grasping end effectors 182A and 182B in desired locations. Robots 180A and 180B each further controls the two opposed "claws" of their corresponding grasping end effector 182A, 182B to actuate the claws between at least an open position and a closed position (and/or optionally a plurality of "partially closed" positions).

Example vision components 184A and 184B are also illustrated in FIG. 1. In FIG. 1, vision component 184A is mounted at a fixed pose relative to the base or other stationary reference point of robot 180A. Vision component 184B is also mounted at a fixed pose relative to the base or other stationary reference point of robot 180B. Vision components 184A and 184B each include one or more sensors and can generate vision data related to shape, color, depth, and/or other features of object(s) that are in the line of sight of the sensors. The vision components 184A and 184B may be, for example, monographic cameras, stereographic cameras, and/or 3D laser scanners. A 3D laser scanner includes one or more lasers that emit light and one or more sensors that collect data related to reflections of the emitted light. A 3D laser scanner may be, for example, a time-of-flight 3D laser scanner or a triangulation based 3D laser scanner and may include a position sensitive detector (PSD) or other optical position sensor.

The vision component 184A has a field of view of at least a portion of the workspace of the robot 180A, such as the portion of the workspace that includes example objects 191A. Although resting surface(s) for objects 191A are not illustrated in FIG. 1, those objects may rest on a table, a tray, and/or other surface(s). Objects 191A include a spatula, a stapler, and a pencil. In other implementations more objects, fewer objects, additional objects, and/or alternative objects may be provided during all or portions of grasp episodes (or other task episodes) of robot 180A as described herein. Moreover, in many implementations objects 191A can be replaced (e.g., by a human or by another robot) with a different set of objects periodically to provide diverse training data.

The vision component 184B has a field of view of at least a portion of the workspace of the robot 180B, such as the portion of the workspace that includes example objects 191B. Although resting surface(s) for objects 191B are not illustrated in FIG. 1, they may rest on a table, a tray, and/or other surface(s). Objects 191B include a pencil, a stapler, and eyeglasses. In other implementations more objects, fewer objects, additional objects, and/or alternative objects may be provided during all or portions of grasp episodes (or other task episodes) of robot 180B as described herein. Moreover, in many implementations objects 191B can be replaced (e.g., by a human or by another robot) with a different set of objects periodically to provide diverse training data.

Although particular robots 180A and 180B are illustrated in FIG. 1, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth.

Also, although particular grasping end effectors are illustrated in FIG. 1, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although particular mountings of vision sensors 184A and 184B are illustrated in FIG. 1, additional and/or alternative mountings may be utilized. For example, in some implementations, vision sensors may be mounted directly to robots, such as on non-actuable components of the robots or on actuable components of the robots (e.g., on the end effector or on a component close to the end effector). Also, for example, in some implementations, a vision sensor may be mounted on a non-stationary structure that is separate from its associated robot and/or may be mounted in a non-stationary manner on a structure that is separate from its associated robot.

Robots 180A, 180B, and/or other robots may be utilized to perform a large quantity of grasp episodes and data associated with the grasp episodes can be stored in offline episode data database 150 and/or provided for inclusion in online buffer 112 (of replay buffer(s) 110). Robots 180A and 180B can optionally initially perform grasp episodes (or other task episodes) according to a scripted exploration policy, in order to bootstrap data collection. The scripted exploration policy can be randomized, but biased toward reasonable grasps. Data from such scripted episodes can be stored in offline episode data database 150 and utilized in initial training of critic network 152 to bootstrap the initial training.

Robots 180A and 180B can additionally or alternatively perform grasp episodes (or other task episodes) using the critic network 152, and data from such episodes provided for inclusion in online buffer 112 during training and/or provided in offline episode data database 150 (and pulled during training for use in populating offline buffer 114). The episodes provided for inclusion in online buffer 112 during training will be online episodes. However, the version of the critic network 152 utilized in generating a given episode can still be somewhat lagged relative to the version of the critic network 152 that is trained based on instances from that episode. The episodes stored for inclusion in offline episode data database 150 will be an offline episode and instances from that episode will be later pulled and utilized to generate transitions that are stored in offline buffer 114 during training.

The data generated by a robot 180A or 180B during an episode can include state data, robotic actions, and rewards. Each instance of state data for an episode includes at least vision-based data for an instance of the episode. For example, an instance of state data can include a 2D image when a vision component of a robot is a monographic camera. Each instance of state data can optionally include additional data such as whether a grasping end effector of the robot is open or closed at the instance. More formally, a given state observation can be represented as s E S.

Each of the robotic actions for an episode defines a robotic action that is implemented in the current state to transition to a next state (if any next state). A robotic action can include a pose change for a component of the robot, such as pose change, in Cartesian space, for a grasping end effector of the robot. The pose change can be defined by the action as, for example, a translation difference (indicating a desired change in position) and a rotation difference (indicating a desired change in azimuthal angle). The robotic action can further include, for example, a component action command that dictates, for instance whether a gripper is to be opened, closed, or adjusted to a target state between opened and closed (e.g., partially closed). The robotic action can further include a termination command that dictates whether to terminate performance of the robotic task. The terminal state of an episode will include a positive termination command to dictate termination of performance of the robotic task.

More formally, a given robotic action can be represented as $a \in A$. In some implementations, for a grasping task, A includes a vector in Cartesian space $t \in R^3$ indicating the desired change in the gripper position, a change in azimuthal angle encoded via a sine-cosine encoding $r \in R^3$, binary gripper open and close commands gopen and gclose and a termination command e that ends the episode, such that a=(t, r, gopen and gclose, e).

Each of the rewards can be assigned in view of a reward function that can assign a positive reward (e.g., "1") or a negative reward (e.g., "0") at the last time step of an episode of performing a task. The last time step is one where a termination action occurred, as a result of an action determined based on the critic network indicating termination, or based on a maximum number of time steps occurring. Various self-supervision techniques can be utilized to assign the reward.

Also illustrated in FIG. 1 is the offline episode data database 150, the replay buffer(s) 110, bellman updaters 122A-N, training workers 124A-N, and a critic network 152. It is noted that all components of FIG. 1 are utilized in training the critic network 152. However, once the critic network 152 is trained (e.g., considered optimized according to one or more criteria), the robots 180A and/or 180B can perform a robotic task using the critic network 152 and without other components of FIG. 1 being present.

As mentioned herein, the critic network 152 can be a deep neural network model, such as the deep neural network model that approximates a Q-function that can be represented as $\Omega_\theta(s, a)$, where $\theta$ denotes the learned weights in the neural network model. Implementations of reinforcement learning described herein seek the optimal Q-function ($Q_\theta(s, a)$) by minimizing the Bellman error. This generally corresponds to double Q-learning with a target network, a variant on the standard Bellman error, where $Q_{\bar{\theta}}$ is a lagged target network. The expectation is taken under some data distribution, which in practice is simply the distribution over all previously observed transitions.

Q-learning with deep neural network function approximators provides a simple and practical scheme for reinforcement learning with image observations, and is amenable to straightforward parallelization. However, incorporating continuous actions, such as continuous gripper motion in grasping tasks, poses a challenge for this approach. The approach utilized in some implementations described herein is an alternative approach that maintains the generality of non-convex Q-functions while avoiding the need for a second maximizer network. In the approach, a state s and action a are inputs into the critic network, and the max in Equation (3) above is evaluated by means of a stochastic optimization algorithm that can handle non-convex and multimodal optimization landscapes.

Large-scale reinforcement learning that requires generalization over new scenes and objects uses large amounts of diverse data. Such data can be collected by operating robots 180 over a long duration and storing episode data in offline episode data database 150.

To effectively ingest and train on such large and diverse datasets, a distributed, asynchronous implementation can be utilized. A plurality of log readers (not illustrated) operating in parallel can read historical data from offline episode data 150 to generate transitions that it pushes to offline buffer 114 of replay buffer 120. Further, online transitions can optionally be pushed, from robots 180, to online buffer 112. The online transitions can also optionally be stored in offline episode data database 150 and later read by log readers, at which point they will be offline transitions.

A plurality of Bellman updaters 122A-N operating in parallel sample transitions from the offline and online buffers 114 and 112. In various implementations, this is a weighted sampling (e.g., a sampling rate for the offline buffer 114 and a separate sampling rate for the online buffer 112) that can vary with the duration of training. For example, early in training the sampling rate for the offline buffer 114 can be relatively large, and can decrease with duration of training (and, as a result, the sampling rate for the online buffer 112 can increase). This can avoid overfitting to the initially scarce on-policy data, and can accommodate the much lower rate of production of on-policy data.

The Bellman updaters 122A-N label sampled data with corresponding target values, and store the labeled samples in a train buffer 116, which in some implementations can operate as a ring buffer. In labeling a given instance of sampled data with a given target value, one of the Bellman updaters 122A-N can carry out the CEM optimization procedure using the current critic network (e.g., with current learned parameters).

A plurality of training workers 124A-N operate in parallel and pull labeled transitions from the train buffer 116 randomly and use them to update the critic network 152. Each of the training workers 124A-N computes gradients and sends the computed gradients asynchronously to parameter server(s) (not illustrated). In some implementations, Bellman updaters 122A-N can each perform one or more steps of method 400 of FIG. 4. The training workers 124A-N, the Bellman updaters 122A-N, and the robots 180 can pull model weights form the parameter server(s) periodically, continuously, or at other regular or non-regular intervals and can each update their own local version of the critic network 152 utilizing the pulled model weights.

Figure 2:
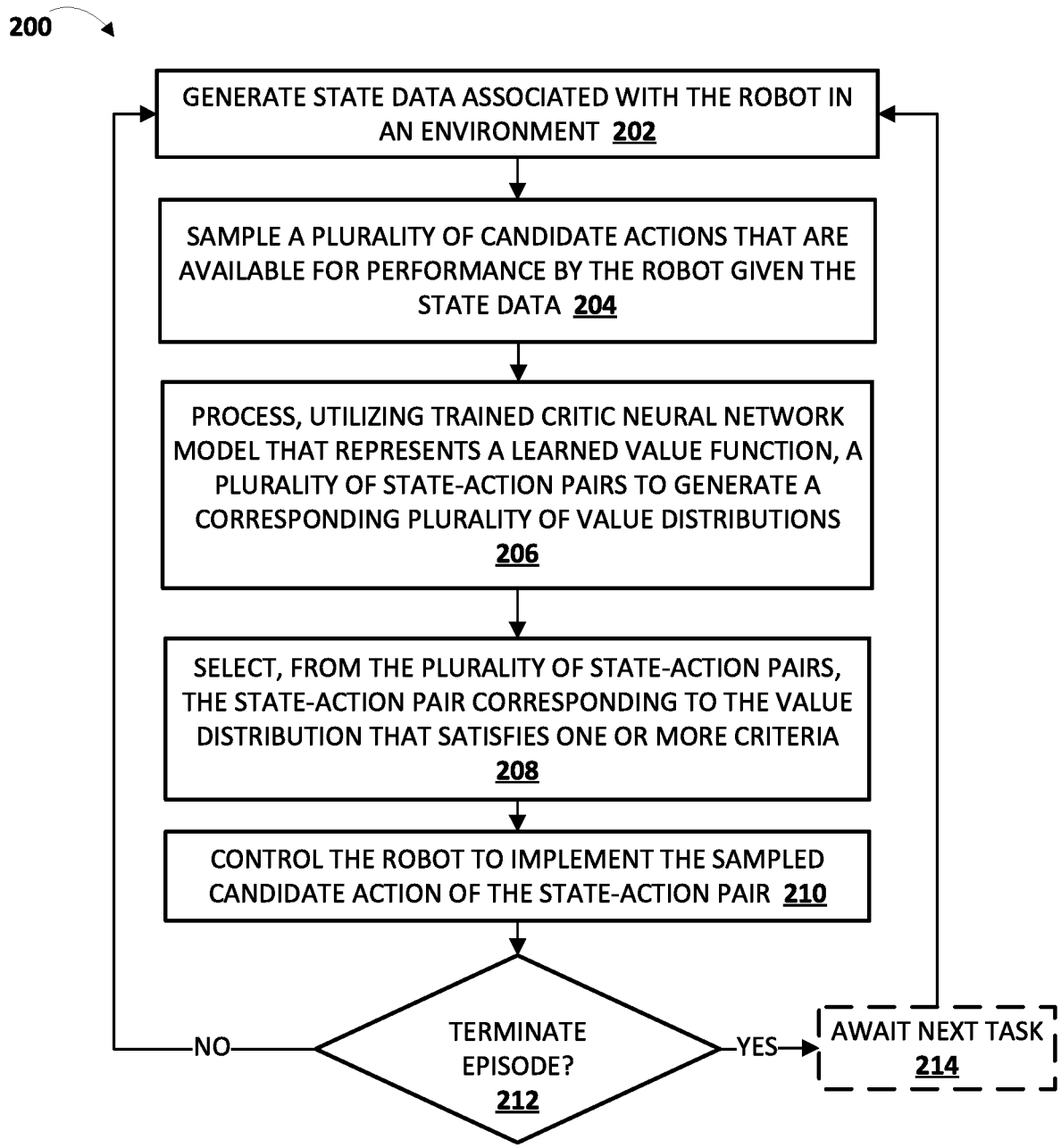
FIG. 2 is a flowchart illustrating an example method of performing a robotic task using a trained critic network.

FIG. 2 is a flowchart illustrating an example method 200 of controlling a robot using a critic network as described herein. For convenience, the operations of the flow chart are described with reference to a system that performs the operations. This system may include one or more components of one or more robots, such as one or more processors of one of robots 180A and 180B. Moreover, while operations of method 200 are shown in a particular order, this is not meant to be limiting. One or more operations may be reordered, omitted or added.

At block 202, the system may generate state data associated with the robot in an environment. As noted previously, the state data may be generated based at least in part on vision data captured by a vision component of the robot (or by a standalone vision component). At block 204, the system may sample a plurality of candidate actions that are available for performance by the robot given the state data. In some implementations, the plurality of candidate actions may be sampled from a continuous action space. In some implementations, the system may employ stochastic techniques such as the CEM to iteratively sample candidate actions that are ultimately more likely to be efficient and/or successful.

At block 206, the system may process, e.g., utilizing a trained critic neural network model such as 152 that represents a learned value function, a plurality of state-action pairs to generate a corresponding plurality of value distributions. Each state-action pair may include the state data generated at block 202 and one of the plurality of candidate actions sampled at block 204.

At block 208, the system may select, from the plurality of state-action pairs, the state-action pair corresponding to the value distribution that satisfies one or more criteria. In various implementations, for each value distribution of the plurality of value distributions, a summary value may be calculated based on the distribution. These summary values—which may take various forms such as means, quartiles, medians, etc. —may be analyzed to determine whether one or more of the aforementioned criteria are satisfied. In other words, these summary values enable selection from a plurality of different sampled candidate actions. In some implementations, the sampled candidate action having the greatest summary value may be selected, although this is not required.

In some implementations, prior to calculating summary values for value distributions, the system may distort the value distributions based on a desired measure of risk seeking. For example, if a conservative (risk averse) approach is desired, then values of a value distribution that correspond to more conservative behavior may be weighted more heavily. If a more risky approach is permissible or desired, then values (e.g., quantiles) of the value distribution that correspond to less conservative behavior may be weighted more heavily (or the sampled candidates may be distorted prior to generation of the value distributions). These weightings may be used in calculating summary values, such that the desired measure of risk taking is incorporated into the summary values.

The desired measure of risk-seeking may be a value on a spectrum between risk-averse (e.g. conservative) and risk-seeking (e.g., aggressive) behavior. In some implementations, the desired measure of risk-seeking may be determined based on a variety of different signals. These signals may include but are not limited to attributes of the robotic task (e.g., its difficulty, a measure of experience in performing similar tasks, a time allotted for performing the task, etc.), attributes of an object to be acted upon as part of the robotic task (e.g., its value, fragility, replicability, etc.), attributes of the robot's environment (e.g., uncertainty, entropy, etc.), user preferences, and so forth. In some implementations, a higher measure of risk-seeking may be desired during training, e.g., to develop good training data and/or to train the critic model, and therefore the desired measure of risk seeking may be selected to more heavily weight portions of value distributions corresponding to greater risks.

As one non-limiting example, suppose a sampled candidate action has a value distribution in the form of a vector with values from 0.3 to 0.8, with each value representing a probability of success. Suppose further that the summary value is calculated as the mean of the values in the vector, and assume without distortion this summary value would be 0.55. Now, suppose a desired measure of risk seeking is selected to favor risk-seeking (non-conservative) behavior. This may result in the value distribution being distorted to more heavily weight values above the mean than below the mean (e.g., values in the top quartile). Once those above-mean values are weighted more heavily, the summary value would increase from 0.55 to a greater number. By contrast, if the value distribution is distorted based on a conservative desired measure of risk seeking, such that values below 0.55 are weighted more heavily, then the summary value will reflect this by decreasing from 0.55 to a lesser number.

In other implementations, rather than distorting the value distribution after-the-fact, the input to the quantile function may be distorted prior to application of the quantile function. For example, instead of providing uniform noise samples over [0,1], as described above with respect to equation (9) (e.g., $\tau_i \sim U[0,1]$, $\tau'_j \sim U[0,1]$, and $\tau''_j \sim U[0,1]$), samples (e.g., $\tau_i$) may be provided from a non-uniform distribution over [0,1]. The neural network may then produce value distributions with risk distortion already applied. Summary values (e.g., means) can then be generated directly from the pre-distorted value distributions.

In some implementations, object recognition processing may be performed on the vision data to identify a class of an object present in the environment. This object recognition may be one of the "out-of-band" signals that may be considered, for instance, when determining a desired measure of risk-seeking. If the robot is "good" or "experienced" with operating on objects of that class, then the desired measure of risk-seeking may be high, and the value distributions will be distorted accordingly.

In some implementations, the desired measure of risk-seeking may be determined based on a measure of experience of the robot in performing the robot task or other robotic tasks that share one or more attributes with the robotic task. In some such implementations, features of the assigned robotic task may be extracted and used to determine an embedding in a latent space that includes embeddings of other robotic tasks. Similar tasks may be identified, for instance, based on their respective Euclidian distances from the assigned robotic task in latent space.

Generally speaking, risk-averse robotic operation may be desirable in various scenarios, such as in highly dynamic environments (e.g., environments with large measures of entropy) in which there are multiple changing/moving objects that may increase the probability of failure beyond what is determined by critic network 152, or in uncertain environments in which the environment is not well known. In the latter case, the robot may be operated cautiously (e.g., slowly, with more impedance, etc.) to decrease the likelihood of failure caused by an unknown object.

Risk-averse robot operation may also be desirable, for instance, where the vision data applied by the critic network lacks important information. When processing vision data depicting a glass champagne flute, a critic network used to operate a robot may output a value distribution that indicates a low probability of failure. However, it might have been the case that, during training, the critic network was only trained on training data that included vision data of plastic champagne flutes, which are considerably less fragile than glass. Yet, another object recognition routine implemented by the robot may detect that the champagne flute is made of glass, and therefore is very fragile. Accordingly, the robot may be operated cautiously, in spite of the high confidence of critic network of success, to reduce the likelihood of the glass champagne flute being damaged or destroyed.

If it is desired to operate the robot in a less risk-averse manner, then other criteria may be applied that result in the robot operating more confidently, e.g., more quickly and/or with less impedance. Less-risk adverse robot operation may be desirable, for instance, in well-known environments, and/or in relatively static environments with low entropy, as the robot may accomplish its task more quickly with little risk of failure. Additionally or alternatively, when a robot has extensive experience with performing a robotic task, and/or has a good track record of performing that task (or similar task) successfully, it may be desirable to operate the robot in a less risk-averse fashion to accomplish the task more quickly.

More generally, the out-of-band signals and the risk-reward criteria selected based on those signals may buttress the value distributions generated based on critic network 152. To the extent a robot is assigned an unfamiliar task, or is to operate in an uncertain environments, and/or is to act upon unfamiliar objects, the value distributions generated based on critic network may be incomplete because critic network 152 was not specifically trained for these unknown tasks/environments/objects. The out-of-band signals and the resulting desired measures of risk seeking may be used (e.g., by distorting the value distributions as described above) to address any such shortcomings of the critic network 152.

Referring back to FIG. 2, at block 210, the system may control the robot to implement the sampled candidate action of the state-action pair selected at block 208. At block 212, the system may determine whether the episode is terminated (e.g., the robotic task is complete). If the answer is no, then method 200 may proceed back to block 202 and the "next" state data may be generated. However, if the answer at block 212 is yes, then at block 214, the system may await the next robotic task.

Figure 3:
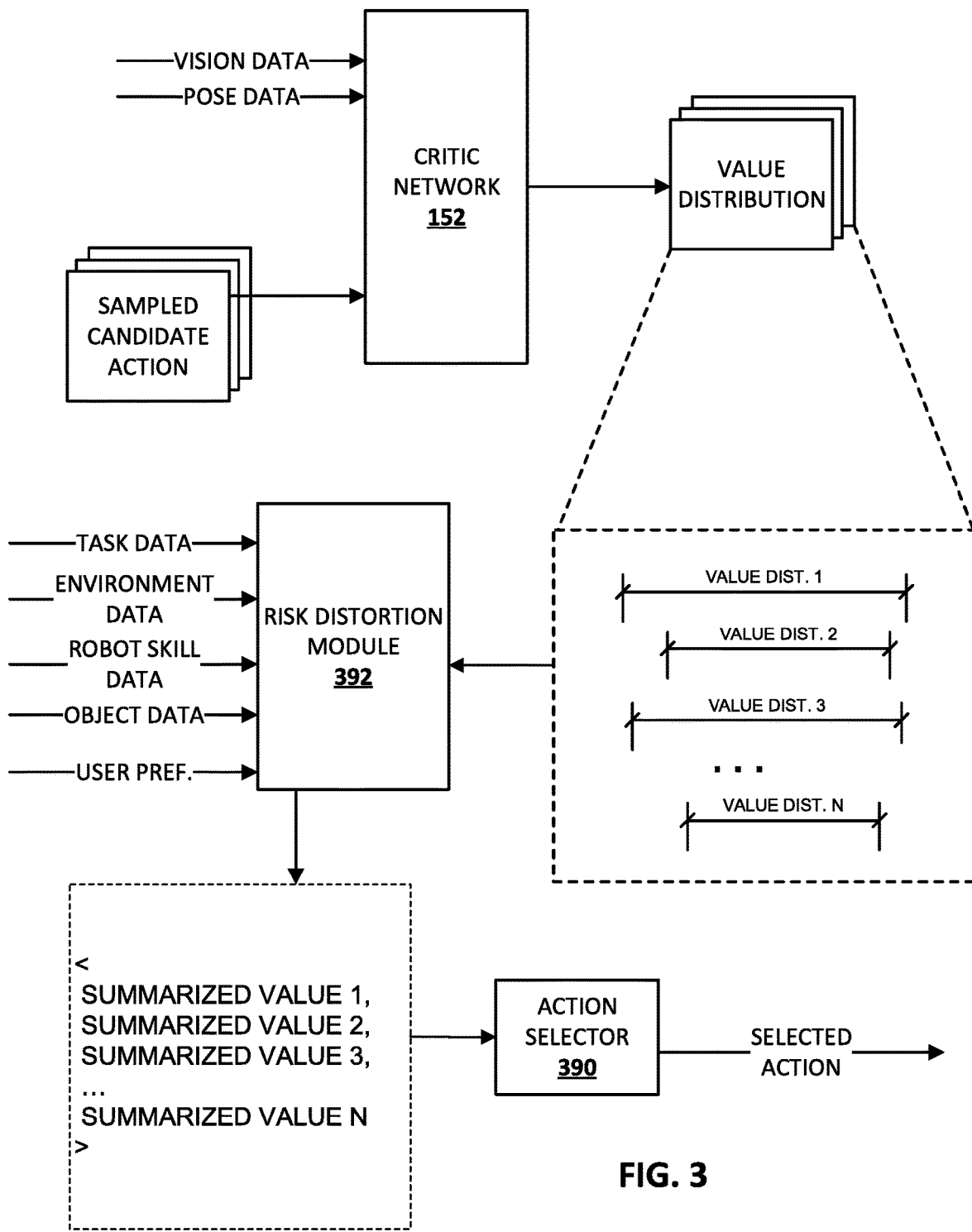
FIG. 3 schematically depicts an example process flow that may occur during an inference state of a critic network, in accordance with various implementations.

FIG. 3 schematically demonstrates one example of how techniques described herein may be used to calculate value distributions, as well as how those value distributions can be distorted based on desired measures of risk-seeking and ultimately used to select candidate actions for performance by a robot. The various components depicted in FIG. 3 may be implemented using any combination of hardware, and may be implemented by one or more processors of one of robots 180A and 180B, or partially or completely separately from a robot.

Vision data, pose data (e.g., claw open or closed, joint positions, etc.), a sampled candidate action, and other data (not depicted) such as sensor data, attributes of the robotic task, etc., may be applied as inputs across critic network 152 to generate output in the form of a value distribution. In FIG. 3, multiple sample candidate actions are applied, e.g., one after the other along with the other data, to generate multiple value distributions 1-N. As shown in the dashed box at the right of FIG. 3, these value distributions may represent ranges (e.g., vectors) of Q values (or probabilities of ultimate robot success during inference) associated with the corresponding sample candidate actions. As noted above, depending on the desired measure of risk seeking to be implemented by the robot when performing the robotic task, the robot may select different candidate actions for implementation based on these value distributions.

In FIG. 3, a risk distortion module 392 may be is configured to process the N value distributions generated by/based on critic network 152. In addition, risk distortion module 392 receives one or more of the aforementioned out-of-band signals that it uses to calculate a desired risk-seeking measure. In some implementations, risk distortion module 392 may calculate the desired risk-seeking measure, which it then uses to distort the value distributions, based on a single signal, such as a user preference explicitly input and/or selected by a user. In some implementations, multiple signals may be considered when determining the desired risk-seeking measure.

In addition to or instead of user preference, in some implementations, a variety of other out-of-band signals may be considered by risk distortion module 392 when determining or calculating the desired risk-seeking measure. In FIG. 3, these out-of-band signals include robotic task data, which may include task attributes such as a measure of difficulty of the task, a time allotted to the robot to perform the task, and so forth. The time allotted to perform the task may be relevant where, for instance, the robot acts upon objects that are carried to it on a conveyor belt or assembly line. The robot may only have so much time to act on one object before the next object is placed in front of it (or, for instance, the line may be halted while the robot completes its task on the object). In such a scenario, the robot may be operated conservatively to minimize the risk of failure and/or of holding up the line, which in turn may maximize the probability that the robot will be ready to act upon the next object.

Another out-of-band signal that may be considered risk distortion module 392 is environmental data, e.g., attributes of the environment in which the robot operates. If the environment is highly dynamic, or at least the knowledge of the environment is uncertain, there may be more obstacles that could potentially impede or even collide with the robot, increasing the risk of the robot failing to perform its task. To the extent these potential obstacles are not captured in the vision data processed using critic network 152, they may not be considered in the N value distributions. Accordingly, risk distortion module can leverage out-of-band knowledge about attributes of the environment to determine the desired risk-seeking measure. Consequently, in a dynamic or uncertain environment in which risk-averse behavior may be desired (but not necessarily signaled in the value distributions), risk distortion module 392 may determine a desired measure of risk-seeking that will distort the value distributions to favor risk-averse summary values. By contrast, in static and/or well-known environments, greater risk-seeking behavior may be desired, or at least acceptable.

Another out-of-band signal that may be considered by risk distortion module 392 is robot skill data. Robot skill data, as mentioned previously, may include various measures of skill and/or experience the robot has (or similar robots have generally) in performing the same robotic task or other robotic tasks that share attributes with the robotic task. It may be the case, for instance, that a robotic task assigned to a robot is new to the robot. However, that robotic task may or may not be similar to other robotic tasks that the robot (or similar robots) has performed previously, developing a track record that is indicative of some level of success. To the extent the newly-assigned robotic task is similar to other robotic tasks for which the robot has demonstrated previous success, risk distortion module 392 may determine a desired risk-seeking measure accordingly. On the other hand, to the extent the newly-assigned robotic task is not similar to other robotic tasks performed by the robot (or by similar robots), risk distortion module 392 may target risk-averse behavior and determine the measure of desired risk-seeking accordingly. As mentioned previously, task similarity may be determined, for instance, by determining Euclidian distances between task embeddings in latent space, or by other methods and/or heuristics.

Yet another out-of-band signal that may be considered by risk distortion module 392 is object data, e.g., attributes of objects to be acted upon by the robot. In some implementations, risk distortion module 392 or another component may perform object recognition on the vision data that is processed using critic network 152 and/or other vision data (e.g., captured by environmental camera(s)) to identify one or more classes of objects-to-be-acted upon. Similar to task data, to the extent the robot has (and/or similar robots have generally) operated successfully or unsuccessfully on other objects of the same or similar class, risk distortion module 392 may select a suitable desired measure of risk-seeking and distort the value distributions accordingly.

Object data may be particularly relevant in scenarios in which a robot is assigned a robotic task of acting upon object(s) generically, regardless of what forms those objects may take (e.g., "please move any object found in area A to area B"). The value distributions generated based on critic network 152 based on vision data captured by the robot in real time may provide some insight as to the likelihood of success of acting upon a given object, but that insight may be incomplete.

Suppose that during training of critic network 152, the training examples in which the object acted upon was roughly spherical mostly involved non-fragile objects such as rubber balls, plastic eggs (e.g., in which candy or other treats may be stored), etc. Whenever such a critic network 152 is presented with vision data depicting a roughly spherical object, the value distributions it produces may indicate relatively high probabilities of success. However, if out-of-band object data reveals that a roughly-spherical object to be acted upon by the robot post-training is fragile, e.g., an egg, risk distortion module 392 may determine a desired measure of risk-seeking that targets more risk-averse behavior, in spite of the robot's past success in acting upon roughly-spherical objects.

As shown in the dashed box at bottom left in FIG. 3, in some implementations, risk distortion module 392 generates a list (or vector) of summary values 1-N. As described previously, each summary value may be generated from a corresponding value distribution, e.g., as a median or mean of all the values, a quartile, an area under a curve formulated using the values of the value distribution, etc. An action selector 390 may be configured to select one or more actions that correspond to the summary value(s) that satisfy some criterion. In some implementations, for example, action selector 390 will select the highest or lowest summary value, the median summary value, the mean summary value, etc. The action(s) selected by action selector 390 may then be implemented by the robot.

Figure 4:
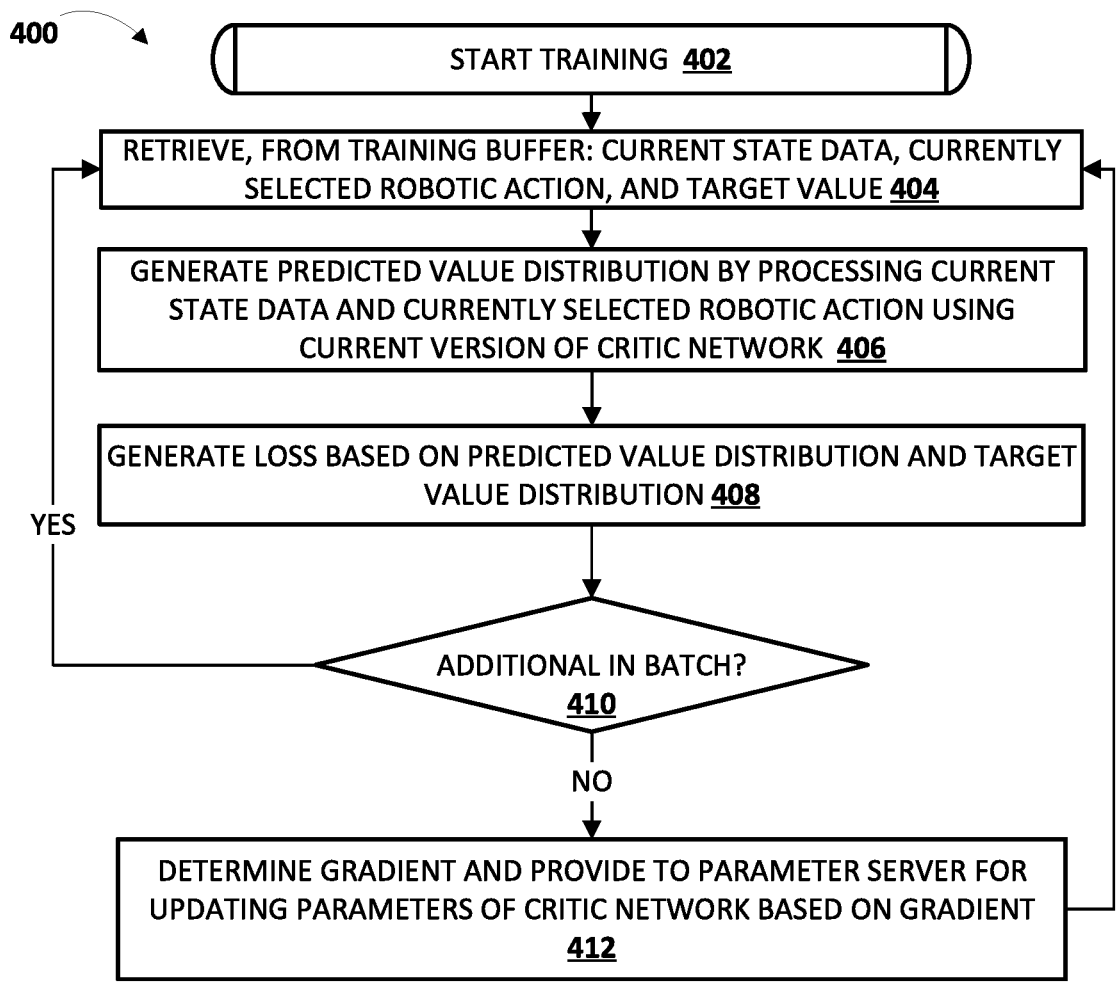
FIG. 4 is a flowchart illustrating an example method of training a critic network.

FIG. 4 is a flowchart illustrating an example method 400 of training a critic network. For convenience, the operations of the flow chart are described with reference to a system that performs the operations. This system may include one or more components of one or more computer systems. Moreover, while operations of method 400 are shown in a particular order, this is not meant to be limiting. One or more operations may be reordered, omitted or added.

At block 402, the system starts training the critic network.

At block 404, the system retrieves, from a training buffer, current state data, a currently sampled/selected robotic action, and a target value distribution.

At block 406, the system generates a predicted value distribution by processing the current state data and the currently selected robotic action using a current version of the critic network. It is noted that in various implementations the current version of the critic network utilized to generate the predicted value distribution at block 406 will be updated relative to the model utilized to generate the target value distribution that is retrieved at block 404. In other words, the target value distribution that is retrieved at block 404 will be generated based on a lagged version of the critic network.

At block 408, the system generates a loss value based on the predicted value distribution and the target value distribution. For example, the system can generate a log loss based on the two value distributions.

At block 410, the system determines whether there is an additional current state data, currently selected robotic action, and target value to be retrieved for the batch (where batch techniques are utilized). If the decision at block 410 is yes, then the system performs another iteration of blocks 404, 406, and 408. If the decision is no, then the system proceeds to block 412.

At block 412, the system determines a gradient based on the loss(es) determined at iteration(s) of block 408, and provides the gradient to a parameter server for updating parameters of the critic network based on the gradient. The system then proceeds back to block 404 and performs additional iterations of blocks 404, 406, 408, and 410, and determines an additional gradient at block 412 based on loss(es) determined in the additional iteration(s) of block 408.

Figure 5:
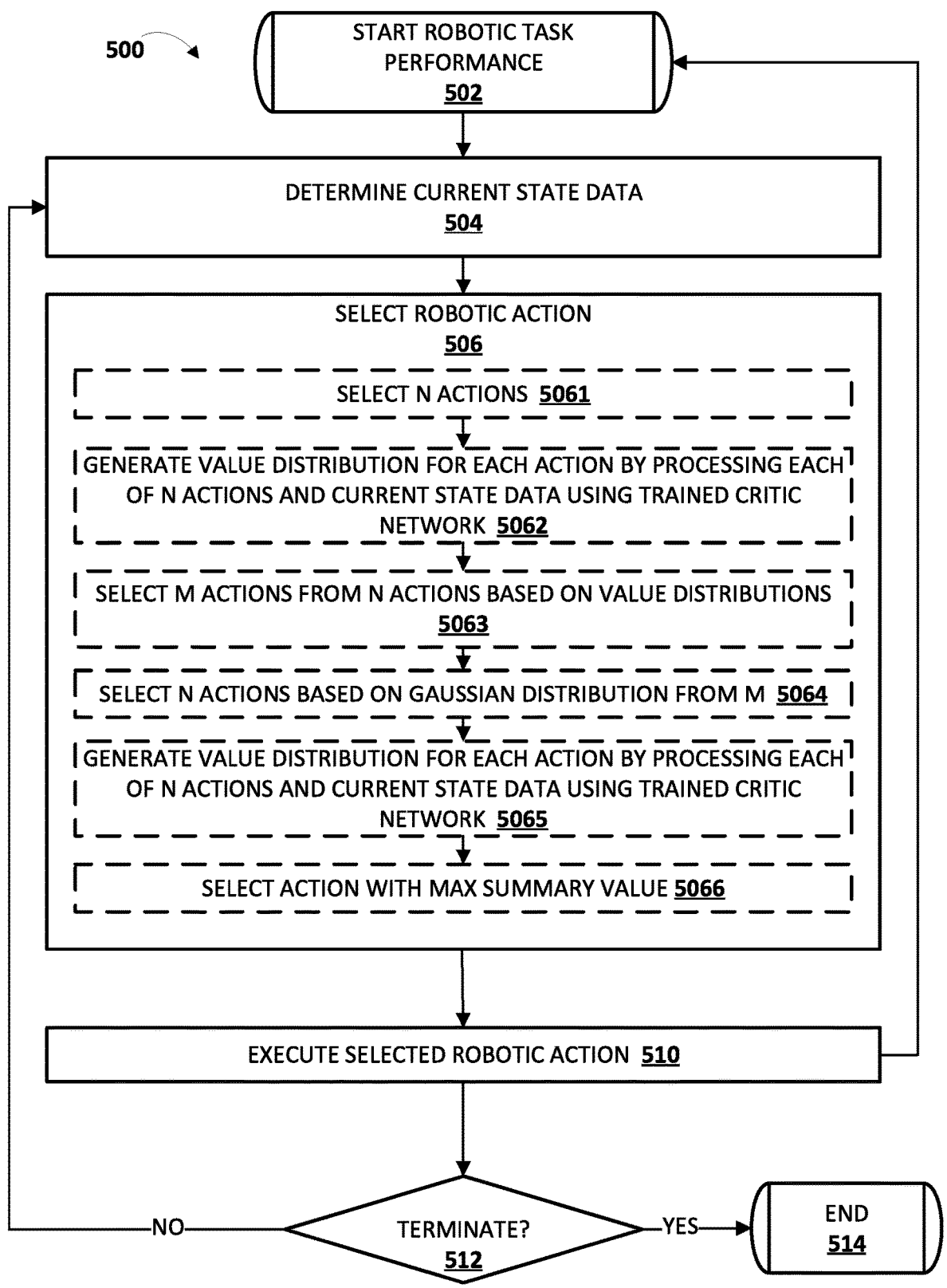
FIG. 5 is another flowchart illustrating an example method of performing a robotic task using a trained critic network.

FIG. 5 is a flowchart illustrating an example method 500 of performing a robotic task using a trained critic network. The trained critic can be trained, for example, based on method 400 of FIG. 4. For convenience, the operations of the flow chart are described with reference to a system that performs the operations. This system may include one or more components of one or more robots, such as one or more processors of one of robots 180A and 180B. Moreover, while operations of method 500 are shown in a particular order, this is not meant to be limiting. One or more operations may be reordered, omitted or added. The method 500 is similar in many respects to method 200 of FIG. 2.

At block 502, the system starts performance of a robotic task.

At block 504, the system determines current state data. The current state data may include, for example, vision data captured by a vision component associated with the robot and/or current state(s) of robotic component(s).

At block 506, the system selects, or "samples," a robotic action to perform the robotic task. Block 506 may be similar to block 204 of FIG. 2, and therefore, operations similar to those forming block 506 in FIG. 5 may be performed as part of block 204 of FIG. 2. In some implementations, the system selects the robotic action using stochastic optimization techniques as described herein. In some implementations, the stochastic optimization technique is CEM and, in some of those implementations, block 506 may include one or more of the following sub-blocks.

At sub-block 5061, the system selects N actions, where N is an integer number.

At sub-block 5062, the system, e.g., based on critic network 152, generates a value distribution for each action by processing each of the N actions and the current state data (including most recently selected robotic action data) using the trained critic network.

At sub-block 5063, the system selects M actions from the N actions based on the generated value distributions, where M is an integer number. Additionally or alternatively, at sub-block 5064, the system selects N actions based on a Gaussian distribution from the M actions. At sub-block 5065, the system generates a value distribution for each action by processing each of the N actions and the current state data using the trained critic network 152.

At sub-block 5066, the system selects a max value from the value distributions generated at sub-block 5065, or a value distribution that satisfies one or more criteria as described previously with respect to block 208 of method 200.

At block 510, the robot executes the selected robotic action.

At block 512, the system determines whether to terminate performance of the robotic task. In some implementations and/or situations, the system can terminate (514) the performance of the robotic task if the robotic action at a most recent iteration of block 506 indicated termination. In some additional or alternative implementations and/or situations, the system can terminate the episode if a threshold quantity of iterations of blocks 504, 506, 508, and 510 have been performed for the performance and/or if other heuristics based termination conditions have been satisfied.

If the system determines, at block 512, not to terminate, then the system performs another iteration of blocks 504, 506, 508, and 510. If the system determines, at block 512, to terminate, then the system proceeds to block 514 and ends performance of the robotic task.

Figure 6:
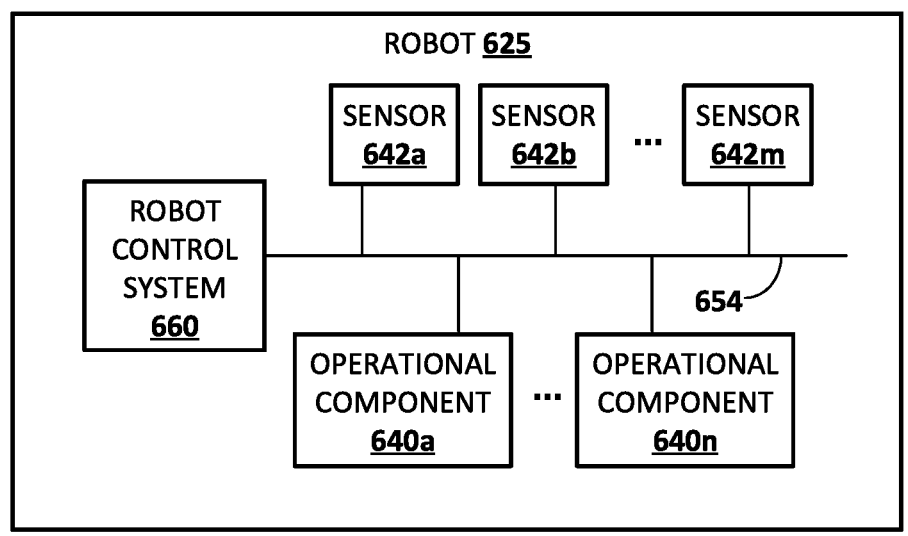
FIG. 6 schematically depicts an example architecture of a robot.

FIG. 6 schematically depicts an example architecture of a robot 625. The robot 625 includes a robot control system 660, one or more operational components 640a-640n, and one or more sensors 642a-642m. The sensors 642a-642m may include, for example, vision sensors, light sensors, pressure sensors, pressure wave sensors (e.g., microphones), proximity sensors, accelerometers, gyroscopes, thermometers, barometers, and so forth. While sensors 642a-642m are depicted as being integral with robot 625, this is not meant to be limiting. In some implementations, sensors 642a-642m may be located external to robot 625, e.g., as standalone units.

Operational components 640a-640n may include, for example, one or more end effectors and/or one or more servo motors or other actuators to effectuate movement of one or more components of the robot. For example, the robot 625 may have multiple degrees of freedom and each of the actuators may control actuation of the robot 625 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 625. In some implementations, the robot 625 may comprise a "brain box" that may include all or aspects of the control system 660. For example, the brain box may provide real time bursts of data to the operational components 640a-640n, with each of the real time bursts comprising a set of one or more control commands that dictate, inter alia, the parameters of motion (if any) for each of one or more of the operational components 640a-640n. In some implementations, the robot control system 660 may perform one or more aspects of methods described herein.

As described herein, in some implementations all or aspects of the control commands generated by control system 660 in performing a robotic task can be based on an action selected based on current state and based on utilization of a trained critic network as described herein. Stochastic optimization techniques can be utilized in selecting an action at each time step of controlling the robot. Although control system 660 is illustrated in FIG. 6 as an integral part of the robot 625, in some implementations, all or aspects of the control system 660 may be implemented in a component that is separate from, but in communication with, robot 625. For example, all or aspects of control system 660 may be implemented on one or more computing devices that are in wired and/or wireless communication with the robot 625, such as computing device 810.

Figure 7:
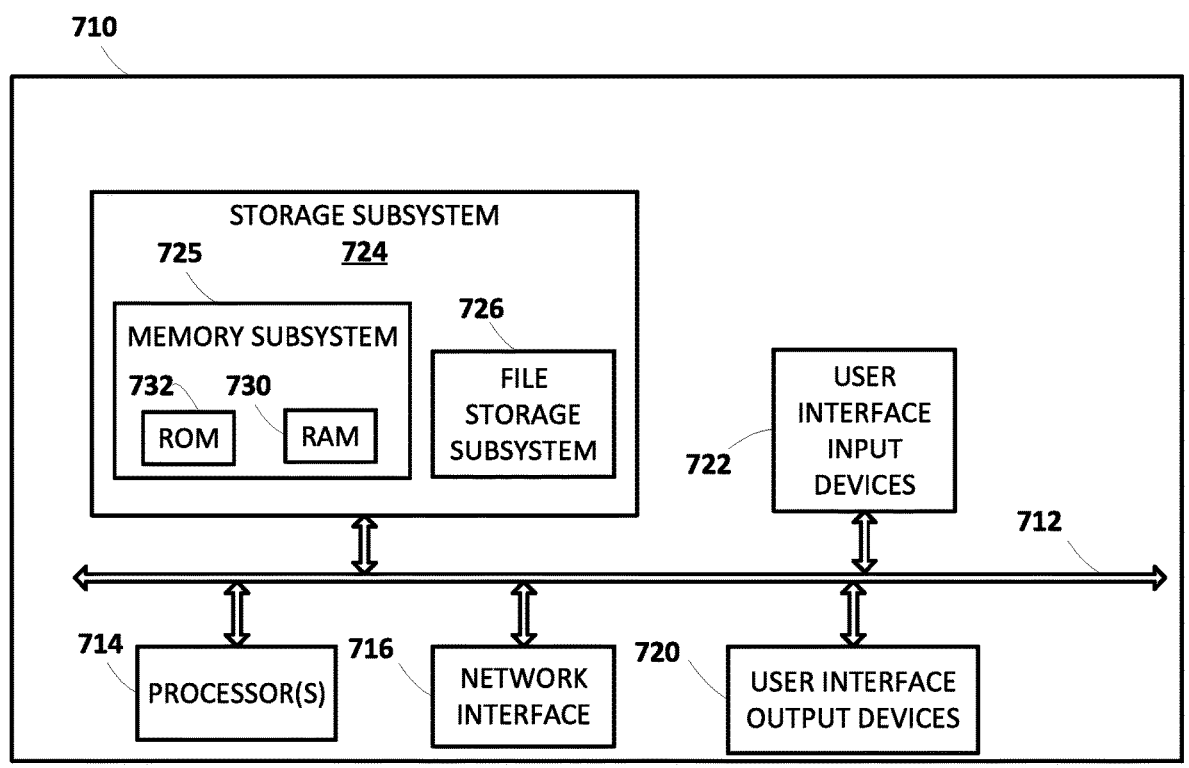
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device. Storage subsystem 724 stores programming and data constructs that provide the functionality of some or all of the modules described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

Figure 8:
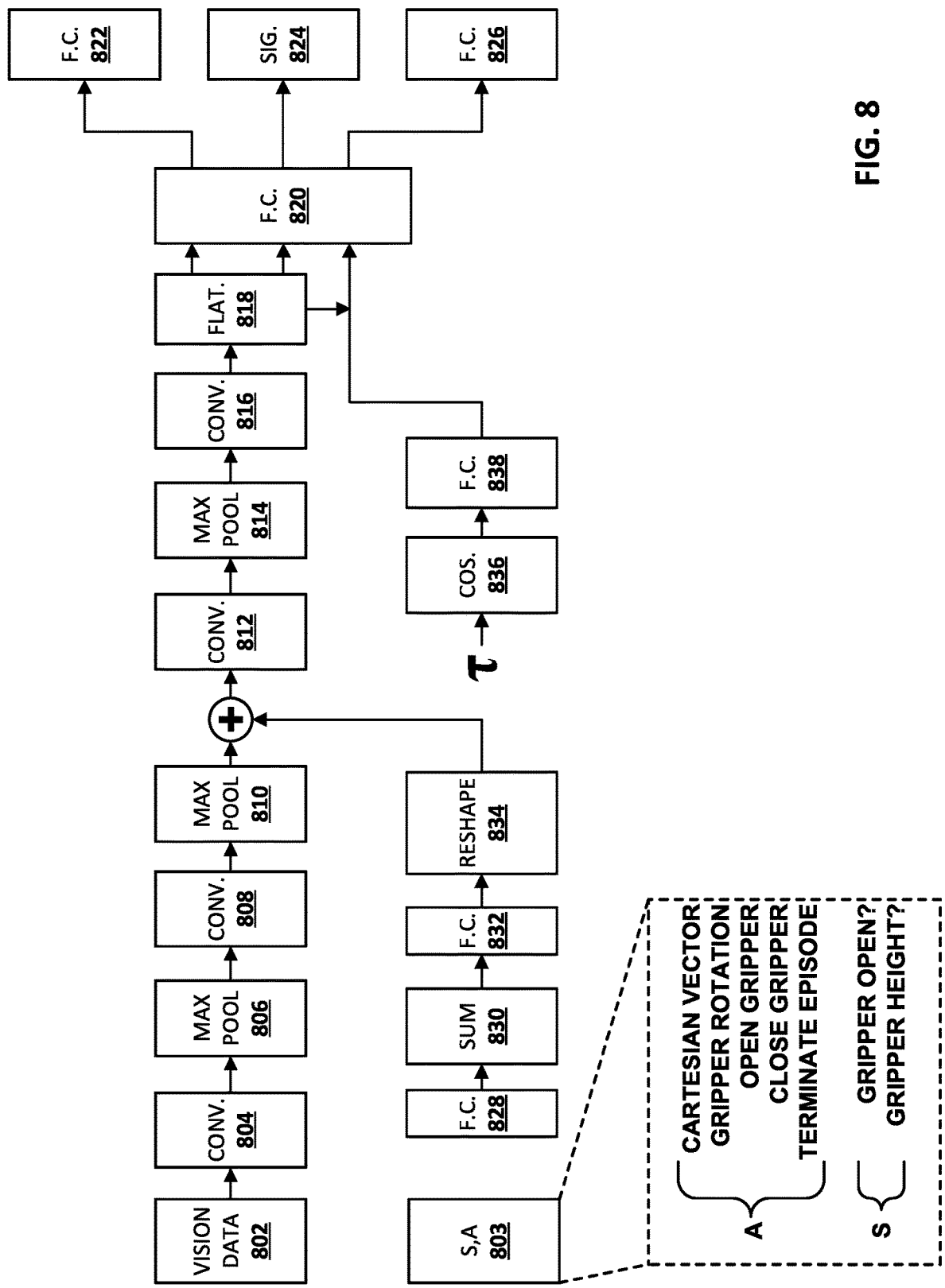
FIG. 8 schematically depicts examples of neural network architectures that may be implemented in accordance with the present disclosure.

FIG. 8 schematically depicts examples of neural network architectures that may be implemented in accordance with the present disclosure. Some of the components depicted in FIG. 8 may be used regardless of whether QT-OPT, distributed Q2R-OPT, or Q2F-OPT are implemented. Others may be specific to each of these individual techniques.

Starting at top left, vision data 802 (e.g., 472×472×3) captured by a robot's vision sensor may be processed in accordance with a first convolutional layer 804 (e.g., with dimensions of 64, 6, and 2), a first max pooling layer 806, repeatedly (e.g., six times) by a second convolutional layer 808, and then by a max pooling layer 810. Meanwhile, and in parallel in some instances, State-Action pairs 803 may be processed in accordance with a first fully-connected ("F.C.") layer 828, a sum layer 830, a second fully-connected layer 832, and a reshaping layer 834 (e.g., 1×1×64). The outputs of the max pooling layer 810 and the reshaping layer 834 may be concatenated and then processed in accordance with a third convolutional layer 812, a third max pooling layer 814, a fourth convolutional layer 816, and a flattening layer 818.

Output of the flattening layer 818 may be provided to a third fully-connected layer 820. With QT-OPT, output of third fully-connected layer 820 may be provided to a fourth fully-connected layer 822. With Q2R-OPT, output of third fully-connected layer 820 may be provided to a sigmoid function 824.

With Q2F-OPT, processing may begin at $\tau$. $\tau$ may be processed in accordance with a cosine embedding layer 836 and by a fifth fully-connected layer 838. Output of fifth fully-connected layer 838 may be provided to third fully-connected layer 820. Then, the output of third fully-connected layer 820 (again, under Q2F-OPT) may be provided to a sixth fully-connected layer 826.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors of a robot to perform a robotic task, the method comprising:
    generating state data associated with the robot in an environment, wherein the state data is generated based at least in part on vision data captured by a vision component of the robot;
    sampling a plurality of candidate actions that are available for performance by the robot given the state data;
    processing, utilizing a machine learning model that has been trained to learn a value function, a plurality of state-action pairs to generate a corresponding plurality of value distributions, wherein each state-action pair includes the state data and one of the plurality of sampled candidate actions;
    selecting, from the plurality of state-action pairs, the state-action pair corresponding to the value distribution that satisfies one or more criteria; and
    controlling the robot to implement the sampled candidate action of the selected state-action pair.

2. The method of claim 1, further comprising calculating, for each value distribution of the plurality of value distributions, a summary value, wherein the selecting includes selecting the state-action pair corresponding to the summary value that satisfies one or more of the criteria.

3. The method of claim 2, wherein the summary value comprises a mean of the value distribution.

4. The method of claim 2, further comprising distorting the value distribution based on a desired measure of risk seeking, wherein the summary value is calculated based on the distorted value distribution.

5. The method of claim 4, wherein the desired measure of risk seeking is determined from one or more signals.

6. The method of claim 5, wherein one or more of the signals includes a measure of entropy associated with the environment.

7. The method of claim 5, wherein one or more of the signals includes a measure of uncertainty associated with the environment.

8. The method of claim 5, wherein one or more of the signals includes one or more attributes of the robotic task.

9. The method of claim 8, wherein the one or more attributes include a measure of skill of the robot in performing the robotic task.

10. The method of claim 8, wherein the one or more attributes include a measure of difficulty of the robotic task.

11. The method of claim 5, wherein one or more of the signals includes a user preference.

12. The method of claim 5, further comprising performing object recognition processing on the vision data to identify a class of an object present in the environment;
    wherein one or more of the signals includes the class of the object.

13. The method of claim 1, wherein the plurality of candidate actions are sampled from a continuous action space.

14. A robot, comprising:
    a vision sensor viewing an environment;
    a trained critic neural network model stored in one or more non-transitory computer readable media, the trained critic neural network model representing a learned value function;
    at least one processor configured to:
    generate state data associated with the robot in an environment, wherein the state data is generated based at least in part on vision data captured by the vision sensor;
    sample a plurality of candidate actions that are available for performance by the robot given the state data;
    process, based on the trained critic neural network learning model, a plurality of state-action pairs to generate a corresponding plurality of value distributions, wherein each state-action pair includes the state data and one of the plurality of sampled candidate actions;
    select, from the plurality of state-action pairs, the state-action pair corresponding to the value distribution that satisfies one or more criteria; and
    control the robot to implement the sampled candidate action of the selected state-action pair.

15. The robot of claim 14, wherein the at least one processor is further to calculate, for each value distribution of the plurality of value distributions, a summary value, wherein the selecting includes selecting the state-action pair corresponding to the summary value that satisfies one or more of the criteria.

16. The robot of claim 15, wherein the summary value comprises a mean of the value distribution.

17. The robot of claim 15, further comprising distorting the value distribution based on a desired measure of risk seeking, wherein the summary value is calculated based on the distorted value distribution.

18. The robot of claim 17, wherein the desired measure of risk seeking is determined from one or more signals.

19. The robot of claim 18, wherein one or more of the signals includes one or more of:
    a user preference;
    a measure of entropy associated with the environment;
    a measure of uncertainty associated with the environment;
    one or more attributes of the robotic task;
    a measure of skill of the robot in performing the robotic task; or
    a measure of difficulty of the robotic task.

20. At least one non-transitory computer-readable medium comprising instructions that, in response to execution of the instructions by one or more processors of a robot, cause the one or more processors to perform the following operations:

generating state data associated with the robot in an environment, wherein the state data is generated based at least in part on vision data captured by a vision component of the robot;

sampling a plurality of candidate actions that are available for performance by the robot given the state data;

processing, utilizing a machine learning model that has been trained to learn a value function, a plurality of state-action pairs to generate a corresponding plurality of value distributions, wherein each state-action pair includes the state data and one of the plurality of sampled candidate actions;

selecting, from the plurality of state-action pairs, the state-action pair corresponding to the value distribution that satisfies one or more criteria; and controlling the robot to implement the sampled candidate action of the selected state-action pair.

\* \* \* \* \*